(No Model.)
G. W. WEIDMAN.
TREADLE FOR BICYCLES.
No. 331,173.  Patented Nov. 24, 1885.
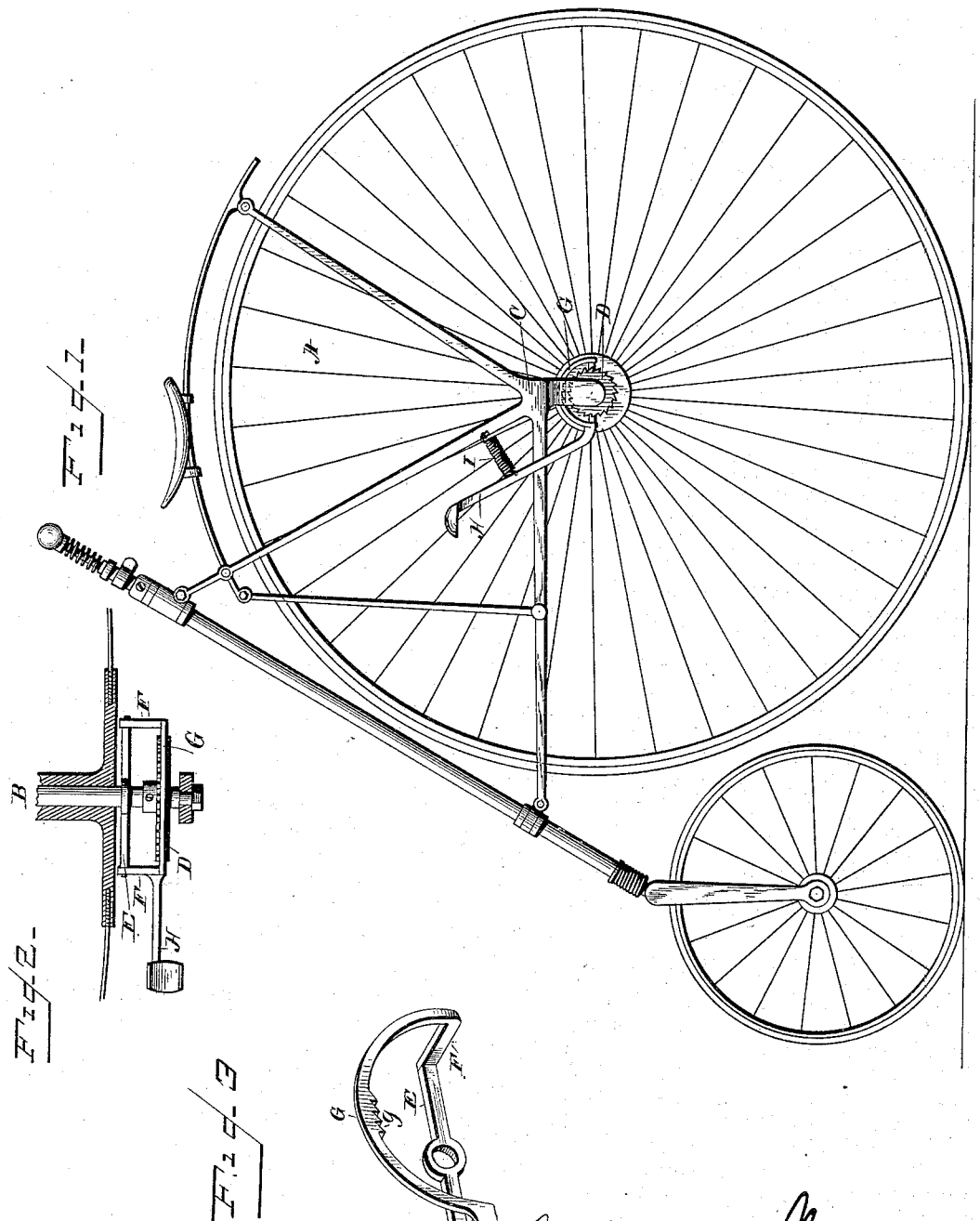
WITNESSES
George W. Weidman
INVENTOR
Attorney

UNITED STATES PATENT OFFICE.

GEORGE W. WEIDMAN, OF WASHINGTON, DISTRICT OF COLUMBIA.

TREADLE FOR BICYCLES.

SPECIFICATION forming part of Letters Patent No. 331,173, dated November 24, 1885.

Application filed October 10, 1885. Serial No. 179,544. (No model.)

*To all whom it may concern:*

Be it known that I, GEORGE W. WEIDMAN, a citizen of the United States of America, residing at Washington, in the District of Columbia, have invented certain new and useful Improvements in Devices for Converting Motion; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in devices for converting a reciprocating motion into a rotary motion, said device being specially adapted to be applied to bicycles; and my invention consists in the construction and combination of parts, as will be hereinafter fully set forth, and specifically pointed out in the claims.

In the accompanying drawings, which illustrate my invention, Figure 1 is a side view of my invention, showing the same applied to a bicycle of the Star pattern. Fig. 2 is a plan view showing the hub of the bicycle-wheel and the end of the fork in section, and Fig. 3 is a perspective view.

In the accompanying drawings, A represents a bicycle, the axle of the driving-wheel being extended and journaled in bearings at the ends of the forks. The wheel at its hub is rigidly attached to the axle, which is indicated by the letter B, and adjacent to the fork C upon the axle B is rigidly attached a ratchet-wheel, D. The axle B, adjacent to the hub of the wheel, has pivotally attached thereto a cross-bar, E, the ends of which are formed into bearings for the reception of the inwardly-projecting arms F, which are rigidly attached or formed integral with the curved bar G, which is provided on its under side near its center with ratchet-teeth $g$. To the forward arm F of the segmental frame is attached a lever or treadle, H, the forward end of which is provided with a bearing end for the foot of the rider. This treadle, lever, or pedal is connected to the frame of the bicycle by a spring device, I, which may either be a spiral spring or a strap, which operates around a barrel or drum.

It will be noted that the foot-lever at the end of the pedal is on a line with a curved bar which lies above the ratchet-wheel D, and the operation of my invention is as follows: The pedal or treadle is normally held in a raised position, as shown in Fig. 1, and when in this position the frame to which said pedal is attached will move upon the pivoted bar, and will raise the curved bar having the ratchet-teeth $g$ out of contact with the ratchet-teeth of the disk attached to the axle, and when out of contact it will be evident that the bicycle can be moved either backward or forward, and that when the parts are thrown out of gear the friction will be greatly reduced. When the operator presses upon the end of the pedal, it will depress the curved bar, and throw the ratchet-teeth thereof into engagement with the ratchet-wheel, said teeth remaining in engagement and moving the wheel forward until the end of the treadle has been depressed to its full extent. It will be noticed that the spring not only brings the lever or pedal to a raised position, but also moves the curved rack-bar pivotally upwardly upon the cross-bar E, through which the axle passes, so as to elevate and move said curved rack-bar above and to one side of the ratchet-wheel. When driving a bicycle having the attachment hereinbefore described, there will be no noise caused by the parts contacting with each other, as there should be no contact between the ratchet-teeth, except when they are in positive engagement to drive the wheel forward, and my improvement may also be used as a brake by holding the treadle down, and while so doing a series of sharp sounds will be caused by the ratchet-teeth moving quickly over the ratchet-bar, thus sounding an alarm as well as putting a brake upon the machine.

I am aware that prior to my invention it has been proposed to convert a reciprocating movement into a rotary movement by employing a ratchet-wheel and pawl; and I do not claim such construction as my invention, as it is evident that the pawl and ratchet, being always in contact with each other, will cause undue wear of the parts, and always cause a noise by reason of the parts moving over each other.

I claim—

1. The device herein described for converting a reciprocating motion into a rotary motion, consisting of a ratchet-wheel attached to an axle, in combination with a frame pivotally secured on a line with the center of the ratchet-wheel when the treadle is depressed, substantially as shown.

2. In a device for converting motion, the axle B, having a ratchet-wheel rigidly attached thereto, said axle having a bar pivotally attached to the same, a curved bar with ratchet-teeth pivotally secured to the bar attached to the axle, and a reciprocating lever attached to the same, the parts being organized substantially as shown.

3. In a bicycle, the combination of the axle B, having a driving-wheel rigidly attached thereto, a ratchet-wheel rigidly secured to said axle, a cross-bar, E, pivotally attached to the axle, and a frame pivoted to said cross-bar, said frame having attached thereto a pedal or lever, which is moved upwardly by a spring device, substantially as shown, and for the purpose set forth.

4. In combination with the drive-wheel of a bicycle, a ratchet-wheel attached to the axle of the same, and provided with a curved bar which is pivotally attached thereto and provided with ratchet-teeth, a treadle having a spring device attached thereto for moving said pedal upwardly, substantially as and for the purpose set forth.

5. In combination with a driving-wheel of a bicycle or velocipede, the ratchet-wheel D, rigidly secured thereto, a cross-bar pivotally attached to said axle, and provided with end bearings for the reception of the inwardly-projecting arms F of the curved bar G, which is provided with ratchet-teeth $g$, a lever attached to the pivoted frame, and provided with a spring device for moving said lever upwardly so as to carry the pivoted frame out of engagement with the ratchet-wheel, substantially as shown, and for the purpose set forth.

6. In a bicycle, the combination of the cross-bar E, which is centrally attached to the axle B, a frame consisting of arms F F, and a curved rack-bar, said frame having attached thereto a pedal, a ratchet-wheel rigidly attached to the axle, and a spring device for moving pedal upwardly, and pivotally moving the ratchet-teeth on the curved bar G out of engagement with the ratchet-wheel, substantially as and for the purpose set forth.

7. The treadle for bicycles herein described, having its end or foot portion to one side of the curved bar G, so that the same will be forced in contact with a ratchet-wheel, D, when depressed, substantially as and for the purpose set forth.

In testimony whereof I affix my signature in presence of two witnesses.

GEORGE W. WEIDMAN.

Witnesses:
 E. W. JOHNSON,
 H. L. BEALL.